Figure 1:
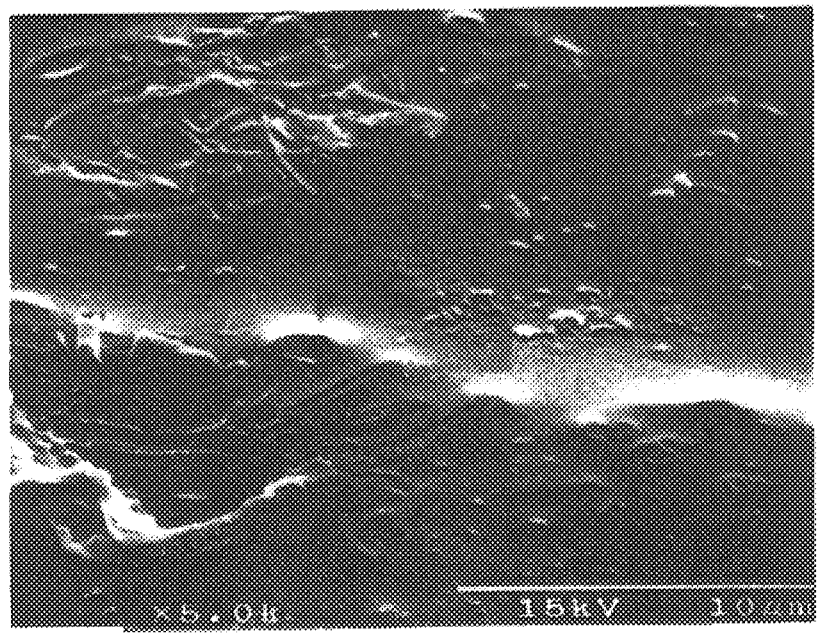

United States Patent [19]
Curtis

[11] Patent Number: 5,842,815
[45] Date of Patent: Dec. 1, 1998

[54] CHEMICAL TREATMENT OF TREADING SURFACES

[75] Inventor: Philip Anthony Curtis, Tamboerskloof, South Africa

[73] Assignee: Arthur Michael Rogers Howes, South Africa

[21] Appl. No.: 752,564

[22] Filed: Nov. 21, 1996

[30] Foreign Application Priority Data

Nov. 23, 1995 [ZA] South Africa ............................ 95/9964

[51] Int. Cl.$^6$ ............................... B08B 3/08; C09K 13/00
[52] U.S. Cl. .............................. 404/75; 404/19; 510/214; 510/238; 510/419; 134/27
[58] Field of Search .................................. 404/19, 72, 75; 134/40, 27; 427/269; 510/214, 240, 419, 238

[56] References Cited

U.S. PATENT DOCUMENTS

| | | |
|---|---|---|
| 3,650,831 | 3/1972 | Jungermann et al. ..................... 134/27 |
| 4,711,735 | 12/1987 | Gulley ....................................... 252/75 |
| 4,749,508 | 6/1988 | Cockrell, Jr. et al. .................. 252/136 |
| 4,877,459 | 10/1989 | Cockrell, Jr. et al. ..................... 134/40 |

*Primary Examiner*—James Lisehora
*Attorney, Agent, or Firm*—Larson & Taylor

[57] ABSTRACT

A chemical solution for neutralizing treading surfaces includes a neutralizing agent such as an alkaline silicate neutralizing solution, a suitable dyestuff (non-indicator dye) and a masking agent (indicator dye) for masking the true color of the dyestuff. The masking agent becomes colorless at a pH of 7.0 or greater. The chemical solution is applied to a suitable treading surface, such as a ceramic tile floor, a suitable time after an acid treatment solution of hydrofluoric acid and nitric acid has been applied to the treading surface. Use of the indicator dye in combination with the non-indicator dye in the chemical solution yields a strongly visible color change which distinguishes the areas that have been sufficiently supplied with neutralizing solution from those that have not been sufficiently supplied with the neutralizing solution.

9 Claims, 2 Drawing Sheets

GLAZE CERAMIC TILE TREATED BY WAY OF
ACID (ACTIVATOR) AND NEUTRALISER (FIXATIVE);
5000x MAGNIFICATION

UNTREATED GLAZE CERAMIC TILE;
5000x MAGNIFICATION

GLAZE CERAMIC TILE TREATED BY
WAY OF ACID (ACTIVATOR) ONLY;
5000x MAGNIFICATION

GLAZE CERAMIC TILE TREATED BY WAY OF
ACID (ACTIVATOR) AND NEUTRALISER (FIXATIVE);
5000x MAGNIFICATION

CHEMICAL TREATMENT OF TREADING SURFACES

FIELD OF INVENTION

The present invention relates to chemical treatment of treading surfaces.

More particularly, the invention relates to the chemical treatment of treading surfaces, such as ceramic files and natural stone flooring materials.

BACKGROUND TO INVENTION

Floor tiles, in particular ceramic floor tiles, often have a smooth surface, which causes them to become slippery. This slippery effect is increased if the tile is wet, e.g. during rain, or after having been cleaned.

Such slippery floors can be dangerous and often have caused serious accidents to take place, not only in shopping centres or other public places, but also in domestic homes in places such as bathrooms.

A method, known to the applicants, of chemically treating treading surfaces to reduce their slipperiness, includes the steps of applying a suitable treatment solution of hydrofluoric acid and nitric acid to a treading surface, such as a ceramic tile; of waiting a suitable length of time; and of applying a neutralising agent to such surface; and of then washing the resultant precipitate away by means of a suitable liquid.

The problem in the practical application of this method is that an uneven application of the neutralising agent leads to an unacceptable "blotchy" appearance on the tile because the duration of contact with the acid portion of the treatment is critical.

If the acid portion on of the treatment remains on the treading surface for too long a period of time before neutralisation occurs, this leads to over-treatment of these areas and even irreversible damage to the floor or tile surface. In addition, unless the acid portion of the treatment is neutralised completely, crystalline structures which are formed on the surface of the tile by the proper addition of the neutralising solution are not formed.

These crystals are an important part of the treatment in that they assist in imparting grip to the floor, and also assist in the hardening of the glaze of a ceramic tile. For this reason, it is vital to ensure that the neutralising solution is spread in such a manner as to completely neutralise all areas of the floor.

In practice, because of "pooling" of the liquids on the floor, there are very often areas of high acid volume and concentration, and other areas of low acid volume and concentration.

In order to identify the non-neutralised areas a method was devised of manually measuring the pH of the solution mixture on the floor by dropping small pieces of litmus paper onto the floor every two or three meters.

This method is unsatisfactory because it does not measure the vast bulk of the floor areas, and over-treatment, with subsequent loss of crystal formation, due to pockets of un-neutralised acid still occur.

It is an object of the invention to suggest a method and means of overcoming this problem.

SUMMARY OF INVENTION

According to the invention, a method of chemically treating treading surfaces to reduce their slipperiness, includes the steps of applying a suitable treatment solution of hydrofluoric acid and nitric acid to a treading surface; of waiting a suitable length of time; of applying a neutralising agent to such surface; and of then washing the resultant precipitate away by means of a suitable liquid, the neutralising agent including a suitable dyestuff and a masking agent for masking the true colour of the dyestuff by an indicator dye, which becomes colourless at a pH of 7.0 or greater.

The treading surface may be constituted by ceramic tiles.

The neutralising agent may be an alkaline silicate neutralising solution.

The alkaline silicate neutralising solution may include fluorocene yellow dye and phenol red dye to mask a yellow colour of the dye to provide a complete red colouring.

A crystalline precipitate may be formed on a treated treading surface.

Also according to the invention, a chemical solution for neutralising treading surfaces treated chemically to reduce their slipperiness by hydrofluoric acid and nitric acid, includes a neutralising agent, a suitable dyestuff and a masking agent for masking the true colour of the dyestuff by an indicator dye, which becomes colourless at a pH of 7.0 or greater.

It has been found that when the solution in accordance with the invention is applied to the acidic solution, the phenol red dye becomes colourless as the pH reaches 6.7 and the whole solution on the floor becomes yellow. Other suitable dyes which, in combination have been found to perform better on different colour tiles due to higher visibility, are Tartrazine, Sugar Blue, Phenolphthalein, Litmus and Bromothymol Blue. Colour changes from deep red to green or purple can be achieved.

In all cases, however, the indicator dyes need to be used in combination with a non-indicator dye in order to obtain a strongly visible colour change.

By using the method for neutralising in accordance with the invention, it becomes immediately apparent to the operator applying the neutralising agent as to which areas have not been sufficiently supplied with neutralising agent, allowing the operator immediately to rectify this deficiency and thus prevent any possible damage to the surfaces being treated and ensure an even distribution of crystals and a uniform anti-slip effect.

EXAMPLES AND TESTS

The invention will now be described further by way of an example of a composition of an acid solution and a neutralising agent and tests as set out below.

EXAMPLE

According to one example, a surface treatment acid solution (hereinafter the ACTIVATOR) contained the following constituents in percentage by mass:

| | | |
|---|---|---|
| 1) | Hydrofluoric Acid, 60% concentration: | 6.7% |
| 2) | Nitric Acid, 54% concentration: | 3.6% |
| 3) | Nonyl Phenyl Ethoxylate containing 6 Moles ethylene oxide: | 1.0% |
| 4) | Water: | 88.7% |

The neutralising agent (hereinafter the FIXATIVE) included the following constituents in percentage by mass:

| | |
|---|---|
| 1) Sodium Metasilicate Pentahydrate: | 7.5% |
| 2) Fluorocene Dye, 1% concentration | 0.5% |
| 3) Phenol Red Indicator | 0.1% |
| 4) Water | 91.9% |

The chemical treatment of floor tiles, in accordance with the invention, was as follows:

1. The correct exposure time and strength of the ACTIVATOR solution for a particular file is established by testing a small area. When the correct exposure time and strength of the solution has been found, the remaining floor area was treated as set out below.
2. The ACTIVATOR solution was spread evenly over the area to be treated by spray or other suitable means.
3. The exposure time as empirically determined was allowed to pass.
4. The FIXATIVE solution was spread evenly across the floor and mixed by means of Nylon-bristled brooms with the solution already on the floor, care being taken to ensure that the solution on the floor turned to the correct colour as determined by the particular dyes incorporated into the neutraliser solution (e.g. would show yellow where not neutralised sufficiently and would revert to red where supplied with sufficient FIXATIVE).
5. A waiting period of 5 minutes was allowed for the development of crystalline silicate precipitates, which occurred as a result of the reaction between the acid phase and the neutraliser phase.
6. The treated area was rinsed by means of water and is thoroughly cleaned.

In the actual operation of the method in accordance with the invention upon application of the FIXATIVE agent a crystalline precipitate was formed. This crystal structure also arises from and is bonded to the tile treading surface but its formation is entirely dependant upon the complete neutralisaton of the ACTIVATOR solution. In areas where complete neutralisation does not occur, this crystalline structure is not formed and this leads to an uneven anti-slip effect and a "blotchy" visual effect.

Also, if the acid portion of the treatment remains on the treading surfaces for too long a period of time before neutralisation occurs, it will lead to over-treatment of these areas and even irreversible damage to the floor or tile surface. This will further exacerbate the "blotchy" appearance.

For these reasons it was found to be vital to ensure that the neutralising solution is spread in such a manner as to completely and timeously neutralise all areas of the floor.

Two tests were conducted on ceramic tiles to establish the improvement of the anti-slip effect achieved by treading tiles by way of an ACTIVATOR and a FIXATIVE in accordance with the invention as compared to a method of treatment by way of acid only.

TEST 1

A test was conducted on glazed ceramic tiles.

Fifteen tiles were split into three groups of five tiles each, and were treated as follows:

Group 1

These tiles were laid on a flat surface and the walking surface of each tile had approximately 11 grams of a 0.1 percent active Hydrofluoric acid solution (ACTIVATOR) applied to it by means of a trigger sprayer.

This solution was prepared with 60 percent active ACTIVATOR and de-ionised water.

The solution was allowed to remain on the tile for a period of 4 minutes and the tiles were then rinsed thoroughly under running tap water.

The tiles were stood on one edge and allowed to air dry.

These tiles were marked "ACID ETCHED".

Group 2

These tiles laid upon a flat surface and the walking surface of each tile was covered with approximately 11 grams of the ACTIVATOR at one part to 15 parts of de-ionised water, using the same method of application as for group 1, above.

The ACTIVATOR was allowed to remain on the surface for a period of 1 minute, whereupon approximately 11 grams of the FIXATIVE at 1 part to 15 parts de-ionised water was spread over the walking surface of each tile.

The FIXATIVE was allowed to remain on the tile surfaces for a period of 25 minutes before being thoroughly rinsed off the tile under running tap water.

The tiles were stood on one edge and allowed to air dry.

These tiles were marked "TREATED WITH ACTIVATOR".

Group 3

These tiles were used as a control and were rinsed thoroughly under running tap water.

The tiles were stood on one edge and allowed to air dry.

These tiles were marked on the back "UNTREATED".

A single tile was selected from each group and tested for slip resistance whilst wet with a TORTUS machine with the following results:

| | |
|---|---|
| Group 1 (Acid Etched) | 0.53 |
| Group 2 (Treated with ACTIVATOR) | 0.54 |
| Group 3 (Untreated) | 0.48 |

These results are not significant as insufficient tests were done, but they were carried out to ascertain that the degree of anti-slip was similar in each of the treated groups.

All three groups of tiles were then submitted to an abrasion test on the walking surface of each tile in order to determine any differences between the three groups of tiles.

The result of the abrasion test was as follows:

| | Acid etched Group 1 | Treated ACTIVATOR Group 2 | Untreated Group 3 |
|---|---|---|---|
| Number of revolutions before wear is noticeable | 600 | 750 | 450 |

It was clear that the Group 2 tiles (ACTIVATOR treated) showed the best wear.

TEST 2

A test was conducted to show a comparison of the friction coefficients of untreated and treated ceramic tiles.

The ceramic tiles of three groups of tiles A, B, C were split into six samples of each type; three tiles of each type were untreated and three tiles of each type were treated with ACTIVATOR.

Dry surfaces:

The Tortus Floor Tester was used to estimate the dynamic coefficient of friction of the tiles under dry conditions. The Tortus has been designed to reproduce the contact area and pressure of a shoe heel when it touches the ground during walking. Both rubber and leather test sliders were used.

Wet surfaces:

After the Tortus measurements, the surfaces were lightly sprayed with water and the dynamic coefficient of friction was assessed from measurements made with the TTRL pendulum tester. The machine uses a swinging pendulum with a spring loaded rubber foot The pendulum is released from a horizontal position and the rubber foot slides along the test surface; the degree of upswing then depends of the resistance to sliding of the rubber foot along the surface.

TEST RESULTS

|  | Untreated | Treated |
|---|---|---|
| Tile A |  |  |
| Rubber dry (T) | 0.50–0.70 | 0.70–0.80 |
| Leather dry (T) | 0.55–0.70 | 0.70–0.80 |
| Rubber wet (P) | 0.45–0.49 | 0.61–0.65 |
| Tile B |  |  |
| Rubber dry (T) | 0.50–0.65 | 0.75–0.90 |
| Leather dry (T) | 0.25–0.50 | 0.40–0.50 |
| Rubber wet (P) | 0.12–0.19 | 0.47–0.52 |
| Tile C |  |  |
| Rubber dry (T) | 0.40–0.65 | 0.60–0.80 |
| Leather dry (T) | 0.30–0.65 | 0.60–0.75 |
| Rubber wet (P) | 0.15 | 0.37–0.44 |

It is required that, when tested in accordance by way of the pendulum test, the pedestrian surface shall have a mean coefficient of friction of not less than 0.4 and no specimen in the sample shall be less than 0.35.

Furthermore, when tested in accordance by way of the Tortus test the pedestrian surface shall have a mean coefficient of friction of not less than 0.4 and no specimen in the sample shall be less than 0.35.

The Royal Australian Institute of Architects (RAIA) has suggested the following relationship between the dynamic coefficient of friction and slip resistance (Practice Note PN-96).

| Co-efficient of Friction | Slip Resistance |
|---|---|
| a) For Tortus Measurements: |  |
| 0.00–0.19 | Dangerous |
| 0.20–0.40 | Marginal |
| 0.41–0.88 | Generally Satisfactory |
| 0.89 + | Excellent |
| b) For Pendulum Measurements |  |
| Less than 0.4 | Unsafe |
| Greater than 0.4 | Satisfactory |

Tile A showed quite good friction values in the untreated state and would not be regarded as being hazardous. The treatment produced considerable increases in the level of friction, of the order 0.1 to 0.2.

Tile B showed some low values for friction in the untreated state; when wet, the values were very low and the surface would be regarded as hazardous, there would be a high chance of a slipping accident. Even in the dry state, for leather, the values are low and accidents could be expected.

The treated tiles had higher values of friction coefficient, above 0.4; and would not be seen as being hazardous, with respect to friction.

Tile C had a very low friction value when wet and is hazardous with a high chance of a slipping accident; the values for dry leather are marginal.

The treated values for the dry state were very high, well above 0.4. The treated values for the wet surface are marginally below 0.4; there are many pedestrian surfaces in use locally with these values and accidents on them are not usual; it is not expected that such a surface to be a hazard.

It is further expected that additional treatment with the applied material would raise the coefficient level for the wet surface to above 0.4.

The treatment of the three different types of ceramic tile the ACTIVATOR has been successful in producing a significant increase in the coefficient of friction.

In the drawings hereafter scanning electron microscope photographs are shown. The various views show the following:

FIG. 1: Untreated Glaze Ceramic Tile; 5000× magnification

Figure 2:
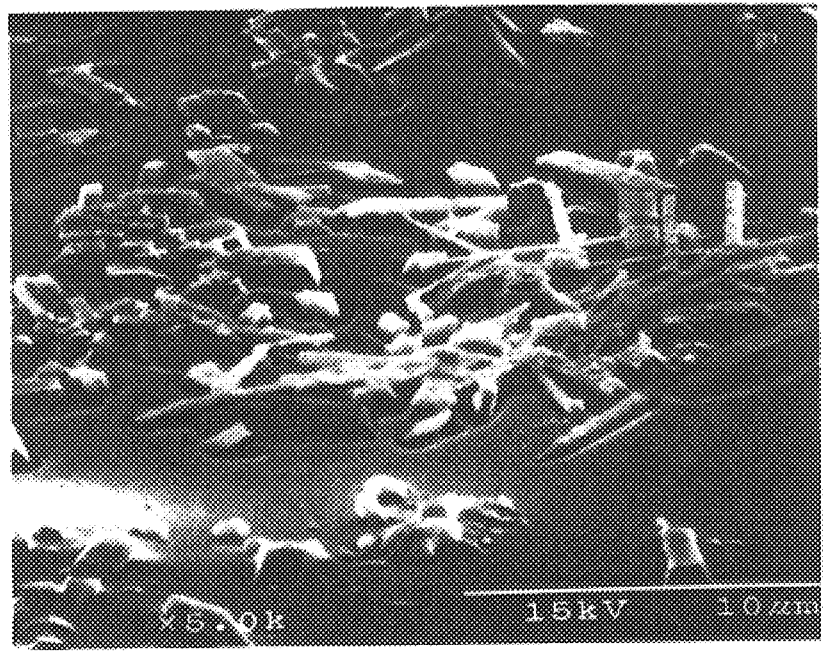
Figure 3:
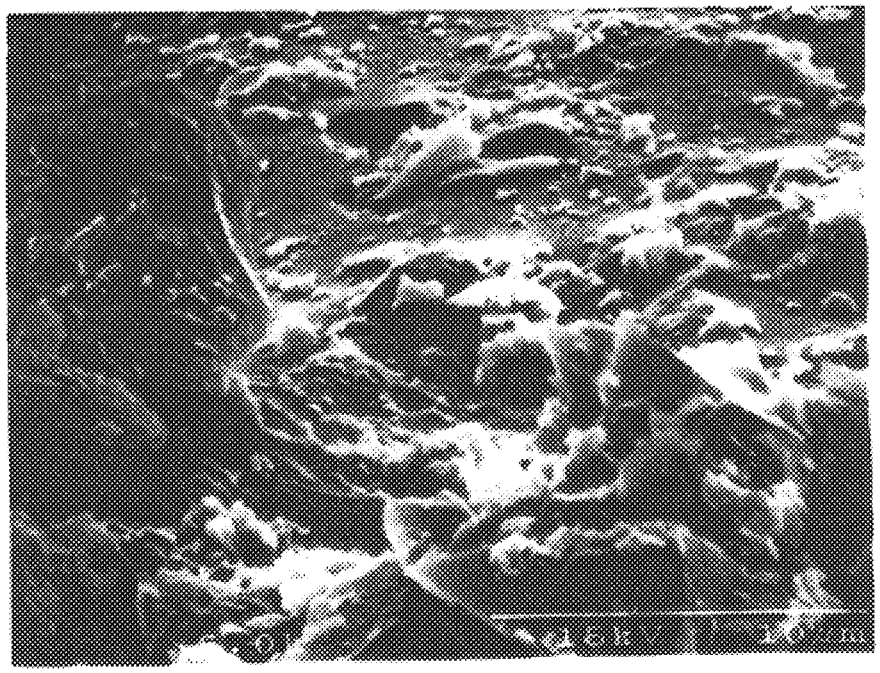

FIG. 2: Glaze Ceramic Tile treated by way of acid (ACTIVATOR) only; 5000× magnification FIG. 3: Glaze Ceramic Tile treated by way of acid (ACTIVATOR) and neutraliser (FIXATIVE); 5000× magnification From the views it is clear that the crystalline structures do not appear unless the FIXATIVE solution has been applied to a tile.

An analysis of the inorganic elements of the crystals formed when a treated tile is completely neutralised by the FIXATIVE is as follows:

| Element | % by weight |
|---|---|
| Silica | 97% |
| Sodium | 2% |
| Calcium | 2% |

This clearly shows that the crystals are constituted predominantly by silica, which has a high hardness.

It is believed that these crystals form an important part of the mechanism of grip on a wet ceramic tile, and also assists in causing the increase in hardness as indicated in the above test results.

Laboratory experiments have shown that the crystal structures do not develop unless the ACTIVATOR is completely neutralised or made alkaline by the addition of sufficient FIXATIVE.

Since the crystals only develop after full neutralisation, the dye in the FIXATIVE provides an important marker for the operator to know when he may begin to time the period during which the ACTIVATOR must remain on the tile surfaces.

From the above results it seems very clear that, not only is it important to completely and evenly neutralise a floor which is being treated with the ACTIVATOR because of aesthetic implications (e.g. the "blotchy" effect), or even from the point of view that damage may occur due to overtreatment of the tiles, but that the floor must be neutralised evenly and completely in order that the crystalline structures develop.

It is also evident that these crystals play an important role in the safety of the tile as a treading surface, and also as an agent in increasing the amount of time that the surface will remain safe because the wear resistance of the surface is increased.

The colour change on the floor consequently is a vital part of the proper treatment.

I claim:

1. A method of chemically treating treading surfaces to reduce their slipperiness, which includes the steps of applying a suitable treatment solution of hydrofluoric acid and nitric acid to a treading surface; of waiting a suitable length of time; of applying a neutralising agent to such surface; and of then washing the resultant precipitate away by means of a suitable liquid, the neutralising agent including a suitable dyestuff and a masking agent for masking the true colour of the dyestuff by an indicator dye, which becomes colourless at a pH of 7.0 or greater.

2. A method as claimed in claim 1, in which the treading surface is constituted by ceramic tiles.

3. A method as claimed in claim 1, in which the neutralizing agent is an alkaline silicate neutralising solution.

4. A method as claimed in claim 3, in which the alkaline silicate neutralising solution includes fluorocene yellow dye and phenol red dye to mask a yellow colour of the dye to provide a complete red colouring.

5. A method as claimed in claim 1, in which a crystalline precipitate is formed on a treated treading surface.

6. A chemical solution for neutralising treading surfaces treated chemically to reduce their slipperiness by hydrofluoric acid and nitric acid, which includes a neutralising agent, a suitable dyestuff and a masking agent for masking the true colour of the dyestuff by an indicator dye, which becomes colourless at a pH of 7.0 or greater.

7. A solution as claimed in claim 6, in which the neutralising agent is an alkaline silicate neutralising solution.

8. A solution as claimed in claim 6, in which the alkaline silicate neutralising solution includes fluorocene yellow dye and phenol red dye to mask the yellow colour of the dye to provide a complete red colouring.

9. A solution as claimed in claim 6, which is adapted to form a crystalline precipitate on a treated treading surface.

* * * * *